(12) United States Patent
Toeda et al.

(10) Patent No.: US 11,516,081 B2
(45) Date of Patent: Nov. 29, 2022

(54) COMMUNICATION DEVICE AND COMMUNICATION METHOD

(71) Applicant: NTT DOCOMO, INC., Tokyo (JP)

(72) Inventors: Teruaki Toeda, Tokyo (JP); Kenji Kai, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/252,616

(22) PCT Filed: Jun. 21, 2018

(86) PCT No.: PCT/JP2018/023709
§ 371 (c)(1),
(2) Date: Dec. 15, 2020

(87) PCT Pub. No.: WO2019/244317
PCT Pub. Date: Dec. 26, 2019

(65) Prior Publication Data
US 2021/0258218 A1    Aug. 19, 2021

(51) Int. Cl.
*H04L 41/0816* (2022.01)
*H04L 41/084* (2022.01)
*H04L 41/08* (2022.01)

(52) U.S. Cl.
CPC ...... *H04L 41/0816* (2013.01); *H04L 41/0843* (2013.01); *H04L 41/0886* (2013.01)

(58) Field of Classification Search
CPC ............. H04L 41/0816; H04L 41/0843; H04L 41/0886

USPC ........................................................ 709/220
See application file for complete search history.

(56) References Cited

U.S. PATENT DOCUMENTS

| 2010/0323758 | A1 | 12/2010 | Amano |
| 2015/0109640 | A1 | 4/2015 | Amano |
| 2019/0253937 | A1* | 8/2019 | Hsieh ..................... H04W 76/15 |
| 2019/0281650 | A1* | 9/2019 | Wu ......................... H04W 76/19 |
| 2020/0296637 | A1* | 9/2020 | Teyeb ............... H04W 36/0069 |
| 2020/0329365 | A1* | 10/2020 | Luo ........................ H04W 24/04 |

FOREIGN PATENT DOCUMENTS

| JP | 2011-002962 A | 1/2011 |
| WO | 2019/160743 A1 | 8/2019 |

OTHER PUBLICATIONS

International Search Report issued in PCT/JP2018/023709 dated Sep. 11, 2018 (7 pages).
Written Opinion of the International Searching Authority issued in PCT/JP2018/023709 dated Sep. 11, 2018 (7 pages).

(Continued)

*Primary Examiner* — Jeffrey R Swearingen
(74) *Attorney, Agent, or Firm* — Osha Bergman Watanabe & Burton LLP

(57) ABSTRACT

A communication device is disclosed including a communication unit configured to receive a message including an SCG configuration, wherein the communication unit transmits a message, which does not include the SCG configuration, to another communication device and causes the another communication device to perform full configuration. In other aspects, another communication device and a communication method are also disclosed.

3 Claims, 12 Drawing Sheets

(56) References Cited

OTHER PUBLICATIONS

3GPP TS 38.473 V15.1.0; "3rd Generation Partnership Project; Technical Specification Group Radio Access Network; NG-RAN; F1 application protocol (F1AP) (Release 15)"; Mar. 2018 (106 pages).
Huawei; "Full configuration indication over F1"; 3GPP TSG-RAN WG3 meeting#99bis, R3-182127; Sanya, China; Apr. 16-20, 2018 (3 pages).
NTT Docomo, Inc.; "Full configuration over F1"; 3GPP TSG-RAN WG3 RAN3-AH-1807, R3-183896; Montreal, Canada; Jul. 2-6, 2018 (6 pages).
Extended European Search Report in counterpart European Application No. 18 92 3423.0 dated Jan. 25, 2022 (13 pages).
Google; "Supporting EN-DC delta configuration in CU-DU architecture"; 3GPP TSG-RAN WG3 #99bis, R3-182085; Sanya, China; Apr. 16-20, 2018 (4 pages).
Google; "Clarification of the default configuration behaviour in SN change"; 3GPP TSG-RAN WG3 #100, R3-182983; Busan, South Korea; May 21-25, 2018 (3 pages).
Office Action issued in the counterpart Korean Patent Application No. 10-2020-7035586, dated Aug. 19, 2022 (8 pages).
Google; "TP for 38.401 in supporting full configuration"; 3GPP TSG-RAN WG3 #99bis, R3-182340; Sanya, China, Apr. 16-20, 2018 (3 pages).

* cited by examiner

FIG.3A

| | Comprehension required part | |
|---|---|---|
| | For EN-DC (SN change) | For SA (Handover) |
| gNB-CU | radioBearerConfig<br><br>in sourceConfigSCG<br><br>in CG-ConfingInfo | radioBearerConfig<br><br>in SourceConfig<br><br>in HandoverPrepartationInformation |
| gNB-DU | secondaryCellGroup<br><br>in sourceConfigSCG<br><br>in CG-ConfingInfo | CellGroupConfig<br><br>in SourceConfig<br><br>in HandoverPrepartationInformation |

FIG.3B

| # | Whether the node can comprehend the source (SCG) configuration | | Needs to transfer (SCG) full configuration |
|---|---|---|---|
| | gNB-CU | gNB-DU | |
| Case 1 | Yes | Yes | No |
| Case 2 | Yes | No | Yes |
| Case 3 | No | Yes | Yes |
| Case 4 | No | No | Yes |

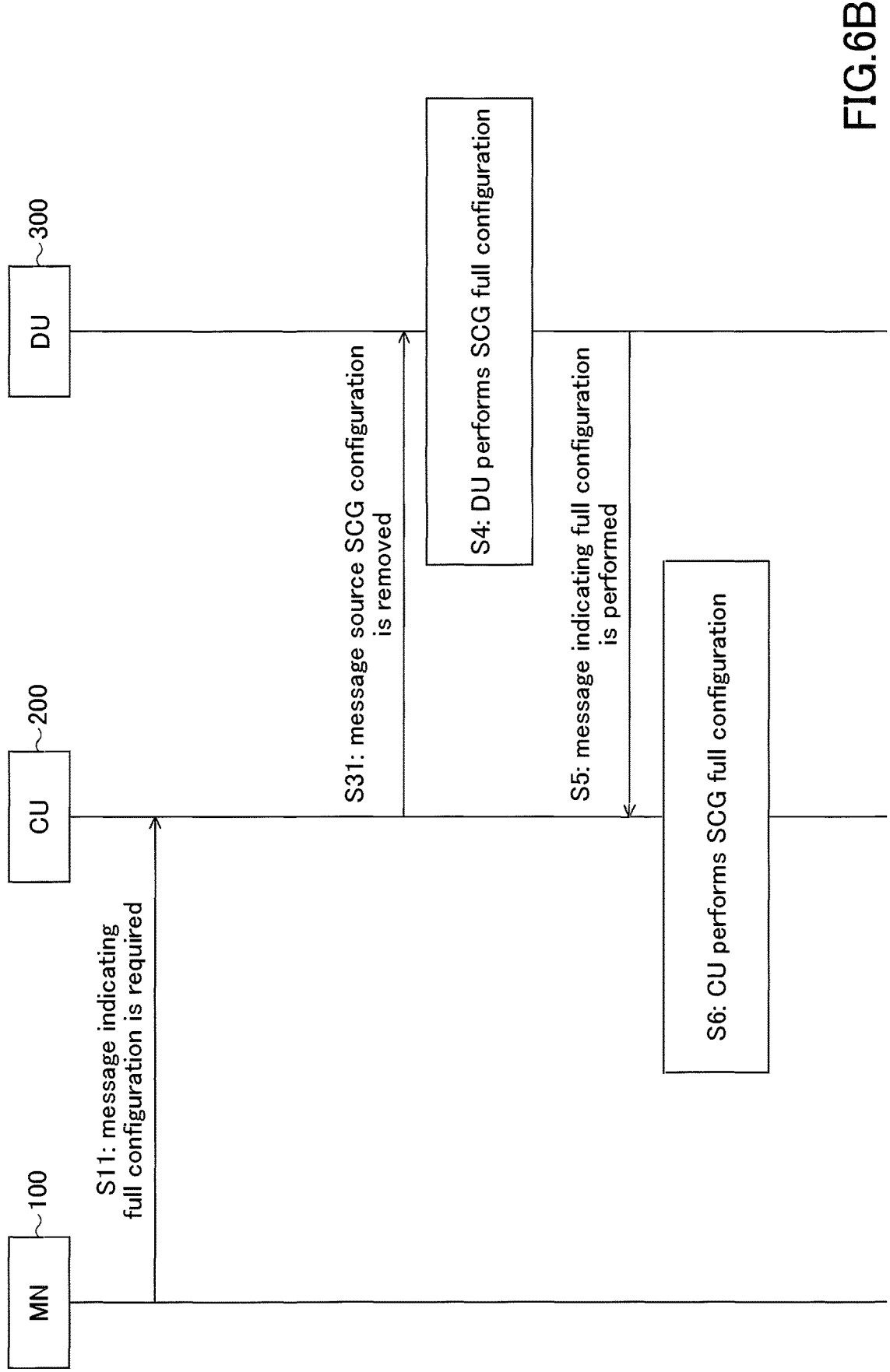

COMMUNICATION DEVICE AND COMMUNICATION METHOD

TECHNICAL FIELD

The present invention relates to a communication device in a radio communication system.

BACKGROUND ART

Currently, with respect to 3GPP (Third Generation Partnership Project), specifications are being developed for a new radio communication system referred to as New Radio Access Technology system (NR) as a successor to LTE (Long Term Evolution) system and LTE-Advanced system. NR may be referred to as 5G.

The NR system assumes that a configuration in which multiple distributed nodes (DU) are extended from one central node (CU) is used as architecture of the radio access network. In this configuration, CU-DU functional separation is made, and as an example, the CU has functions of layers of PDCP or higher and the DU has functions of layers of RLC or lower. The interface between the CU and the DU is standardized as an F1 interface (e.g., non-patent document 1).

In addition, the NR system is considering introduction of EN-DC (E-UTRA-NR Dual Connectivity) which divides data between base stations of the LTE system and base stations of the NR system and simultaneously transmits and receives data by these base stations, as in the case of dual connectivity (DC) in the LTE system. The EN-DC is constituted by a MN (Master Node) and a SN (Secondary Node).

CITATION LIST

Non-Patent Document

Non-patent Document 1: 3GPP TS 38.473 V15.1.0 (2018-03)

SUMMARY OF THE INVENTION

Problem to be Solved by the Invention

As an example of the EN-DC described above, an EN-DC is assumed in which a base station (eNB) of the LTE system constitutes MN, a base station (gNB) of the NR system constitutes SN, and CU and DU constitute the gNB.

In this EN-DC, for example, if an SN change procedure is executed to change the gNB constituting the SN from S-gNB to T-gNB, the CU and DU constituting the T-gNB to which the change is made receive a configured configuration provided by the S-gNB. In this case, when the CU and DU constituting the T-gNB cannot understand the received configured configuration, the CU and DU are required to execute full configuration.

However, since the CU-DU functional separation is made and the functions of layers of the CU and the DU are different, a same configured configuration may not be understood by the CU but be understood by the DU. In this case, the understanding mismatch between the CU and the DU is required to be resolved. However, the method of resolving an understanding mismatch between the CU and the DU has not been specified in the past when the CU cannot understand the received configuration but the DU can understood it.

In addition, when the MN executes full configuration in EN-DC, the SN is also required to execute full configuration. It is considered that the method by which the MN causes the SN to execute full configuration is to transmit to the SN a message requesting execution of full configuration using an X2 interface between the network nodes. However, the operation of the CU when the CU constituting the SN receives the message requesting execution of full configuration has not been specified in the past.

The present invention has been made in light of the above-described points, and the object of the present invention is to provide technology in a radio communication system which resolves an understanding mismatch between CU and DU when the CU cannot understand the received configured configuration but the DU can understand it, and clarifies the operation of the CU when the CU receives a message requesting execution of full configuration.

Means to Solve the Problem

According to the disclosed technology, there is provision of a communication device that notifies another communication device that full configuration is required to be executed when the communication device cannot understand a received configured configuration or when the communication device receives a message requesting execution of full configuration.

Advantage of the Invention

According to the disclosed technology, there is provision of technology in a radio communication system which resolves an understanding mismatch between CU and DU when the CU cannot understand a received configured configuration but the DU can understand it, and clarifies the operation of the CU when the CU receives a message requesting execution of full configuration.

BRIEF DESCRIPTION OF THE DRAWINGS

FIG. 3A is a diagram illustrating parts the CU and the DU are expected to understand for configured configuration;

FIG. 3B is a diagram illustrating four combinations indicating whether the CU and the DU can understand the configured configuration;

FIG. 6B is a diagram illustrating the second method for solving the problem;

MODE FOR CARRYING OUT THE INVENTION

Hereinafter, an embodiment of the present invention (the present embodiment) will be described with reference to the drawings. It is noted that the embodiment described below is merely one example, and embodiments to which the present invention is applied are not limited to the following embodiment.

In the embodiment described below, the terms used in the existing 3GPP specification are used as appropriate, but objects same or similar as those described in the terms may be referred to by other terms.

(CU-DU Functional Separation)

Figure 1:
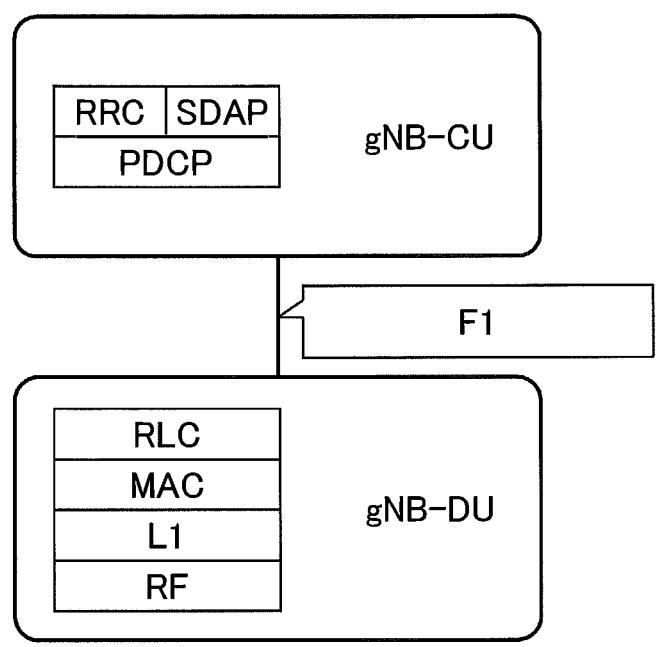
FIG. 1 is a diagram illustrating a configuration example of a CU-DU functional separation.

FIG. 1 shows a configuration example of the CU-DU functional separation according to the present embodiment. As an example, the CU has functions of layers of PDCP or higher, and the DU has functions of layers of RLC or below.

(SN Change Procedure in EN-DC)

Figure 2:
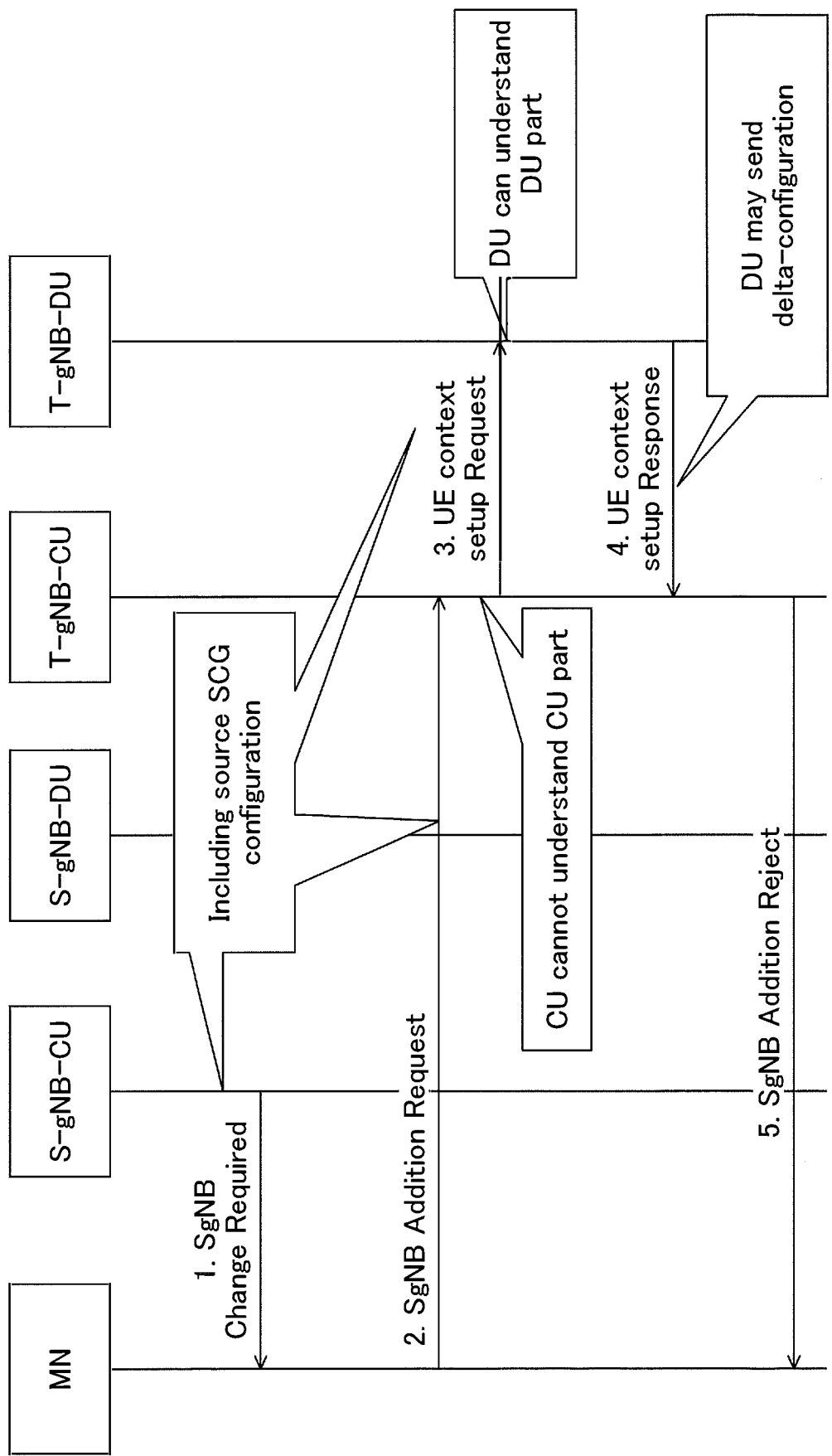
FIG. 2 is a diagram illustrating an example of an SN change procedure in EN-DC.

FIG. 2 is a diagram illustrating an example of an SN change procedure for changing SN in EN-DC. The problem will be described with reference to FIG. 2.

As an example of the EN-DC, an EN-DC is assumed in which a base station (eNB) of the LTE system constitutes MN, a base station (gNB) of the NR system constitutes SN, and CU and DU constitute the gNB. In this EN-DC, an SN change procedure is shown in FIG. 2 to change the gNB constituting the SN from S-gNB to T-gNB. In the SN change procedure of FIG. 2, the CU and DU constituting the S-gNB are referred to as S-gNB-CU and S-gNB-DU, respectively, and the CU and DU constituting T-gNB are referred to as T-gNB-CU and T-gNB-DU, respectively.

In the SN change procedure of FIG. 2, a configured configuration is notified to the T-gNB, i.e., T-gNB-CU and T-gNB-DU. The configured configuration includes parts that the T-gNB-CU should understand (CU part) and parts that T-gNB-DU should understand (DU part). FIG. 3A is a diagram illustrating parts the T-gNB-CU and T-gNB-DU are expected to understand for the configured configuration. An example of the CU part is radioBearerConfig related to configuration of an upper layer (e.g., PDCP). An example of the DU part is CellGroupConfig related configuration of a lower layer (e.g., RLC or below). Thus, the parts that the T-gNB-CU should understand are different form the parts that the T-gNB-DU should understand for the configured configuration. Thus, whether the T-gNB-CU and T-gNB-DU can understand the configured configuration is independent of each other. Four combinations are shown in FIG. 3B, indicating whether the T-gNB-CU and T-gNB-DU can understand the configured configuration.

In FIG. 3B, Case 1 indicates a case where both of the T-gNB-CU and T-gNB-DU can understand the configured configuration. Case 2 indicates a case where the T-gNB-CU can understand the configured configuration, but the T-gNB-DU cannot understand it. Case 3 indicates a case where the T-gNB-CU cannot understand the configured configuration, but the T-gNB-DU can understand it. Case 4 indicates a case where both of the T-gNB-CU and T-gNB-DU cannot understand the configured configuration.

For Case 1 and Case 4 among the four combinations described above, there is no problem because understanding or not understanding with respect to the T-gNB-CU and T-gNB-DU is consistent.

For Case 2, full configuration is generated in both of the T-gNB-CU and T-gNB-DU, resolving an understanding mismatch between the T-gNB-CU and T-gNB-DU. Specifically, the T-gNB-DU which could not understand the configured configuration generates full configuration and notifies T-gNB-CU that full configuration was generated. The T-gNB-CU which received from the T-gNB-DU the notification that the full configuration was generated, generates full configuration. The Full configuration is generated in both of the T-gNB-CU and T-gNB-DU, eliminating the understanding mismatch between the T-gNB-CU and T-gNB-DU.

However, in Case 3, there is a problem that a method to resolve an understanding mismatch between the T-gNB-CU and T-gNB-DU is not specified. Specifically, in the SN change procedure of FIG. 2, the T-gNB-CU which received a message ("2. SgNB Addition Request" in FIG. 2) including the configured configuration cannot understand the configured configuration. The T-gNB-CU transmits to the T-gNB-DU a message ("3. UE Context setup Request" in FIG. 2) including the configured configuration. Since the T-gNB-DU can understand the configured configuration, full configuration is not generated. Then, the T-gNB-DU transmits to the T-gNB-CU a message ("4. UE context setup response" in FIG. 2) including delta-configuration, which is a difference of configuration. Since the delta-configuration, which presumes that the T-gNB-CU can understand the configured configuration, is transmitted to the T-gNB-CU that cannot understand the configured configuration, the understanding mismatch between the T-gNB-CU and T-gNB-DU is not resolved, and the SN change procedure fails ("5. SgNB Addition Reject" in FIG. 2).

(Handover Procedure)

Similar problems can be also described using a handover procedure.

Figure 4:
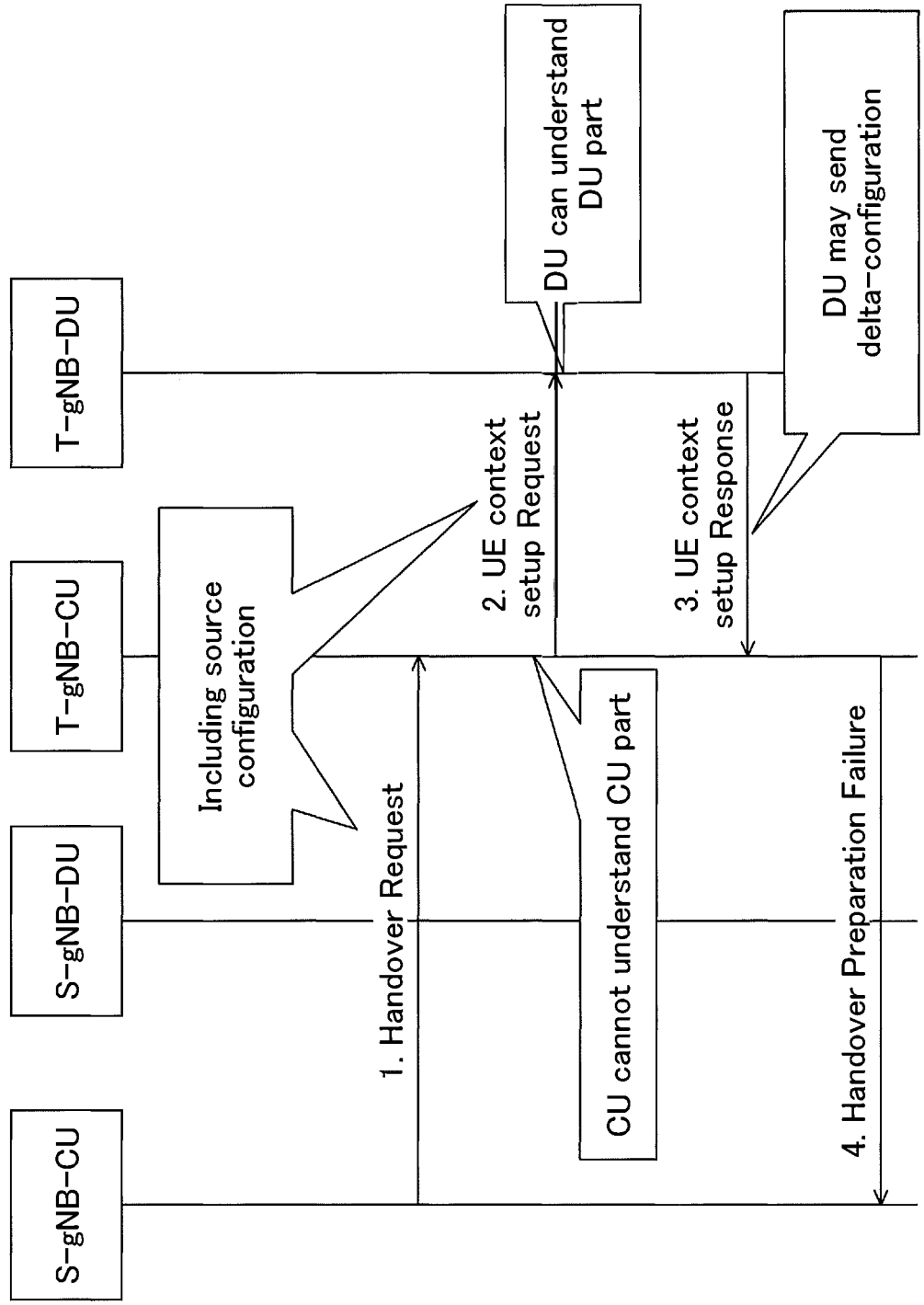
FIG. 4 is a diagram illustrating a handover procedure for explaining a problem.

FIG. 4 is a diagram illustrating a handover procedure for explaining a problem. FIG. 4 shows a handover procedure from S-gNB constituted by S-gNB-CU and S-gNB-DU to T-gNB constituted by T-gNB-CU and T-gNB-DU.

In the handover procedure of FIG. 4, a configured "configuration" is notified to the T-gNB. As with the SN change procedure, there are four combinations indicating whether the T-gNB-CU and the T-gNB-DU can understand the configured configuration (see FIG. 3B). In the handover procedure as well, in the case of Case 3 shown in FIG. 3B, there is a problem that a method for resolving the understanding mismatch between the T-gNB-CU and T-gNB-DU is not specified. Specifically, in the handover procedure of FIG. 4, the T-gNB-CU that received a message ("1. Handover Request" in FIG. 4) including the configured configuration cannot understand the configured configuration. The T-gNB-CU transmits to the T-gNB-DU a message ("2. UE context setup Request" in FIG. 4) including the configured configuration. Since the T-gNB-DU can understand the configured configuration, a full configuration is not generated. Then, the T-gNB-DU transmits to the T-gNB-CU a message ("3. UE context setup Response" in FIG. 4) including delta-configuration, which is a difference of configurations. Since the delta-configuration, which presumes that the T-gNB-CU can understand the configured configuration, is transmitted to the T-gNB-CU that cannot understand the configured configuration, the understanding mismatch between the T-gNB-CU and T-gNB-DU is not resolved, and the handover procedure fails ("4. Handover Preparation Failure" in FIG. 4).

(message requesting execution of full configuration)

In addition, as described above, when the MN executes full configuration in EN-DC, the SN is also required to execute full configuration. For this reason, it may be considered that the MN transmits to the CU constituting the SN a message requesting execution of full configuration. However, the operation of the CU when receiving the message requesting execution of full configuration is not specified.

(First Method)

As a first method of solving the above-described problem, a method of the CU causing the DU to execute full configuration when the CU cannot understand a received configured configuration or when the CU receives a message requesting execution of full configuration will be described with reference to FIGS. 5A and 5B.

First, FIG. 5A will be described.

Figure 5A:
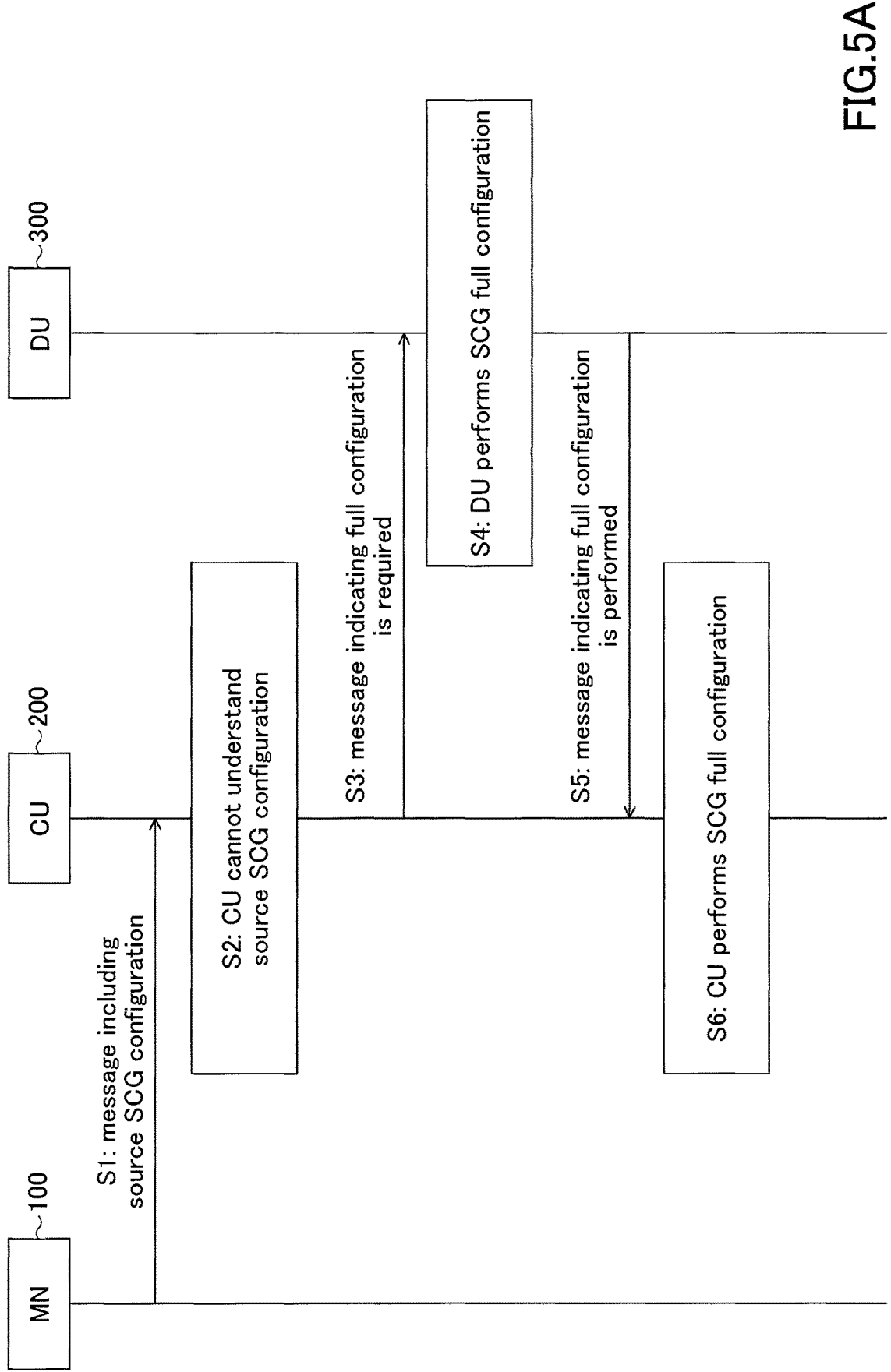
FIG. 5A is a diagram illustrating a first method for solving the problem.

In S1 of FIG. 5A, the CU 200 receives from the MN 100 a message that includes a configured configuration. The message including the configured configuration, for example, corresponds to "2. SgNB Addition Request" in the SN change procedure of FIG. 2 or "1. Handover Request" in the handover procedure of FIG. 4. Here, it is assumed that the CU 200 cannot understand the configured configuration, but the DU 300 can understand it. In S2, the CU 200 cannot understand the configured configuration included in the received message. The CU 200 which could not understand the configured configuration transmits to the DU 300 a message indicating that full configuration is required in S4. The messages indicating that full configuration is required, for example, correspond to "3. UE context setup Request" in the SN change procedure of FIG. 2 or "2. UE context setup Request" in the handover procedure of FIG. 4. The UE context setup request may include, for example, an information element of a F1 interface that explicitly indicates that full configuration is required as information indicating that full configuration is required. The DU 300 which received the message indicating that full configuration is required generates SCG full configuration in S4. In S5, the DU 300 transmits to the CU 200 a message indicating that full configuration has been generated. The Message indicating that full configuration has been generated, for example, corresponds to "4. UE context setup Response" in the SN change procedure of FIG. 2 and "3. UE context setup Response" in the handover procedure of FIG. 4. The CU 200 which received from the DU 300 the message indicating that full configuration has been generated generates full configuration in S6. Thus, full configuration is generated in both of the CU 200 and the DU 300, and the understanding mismatch between the CU and the DU for the configured configuration is resolved.

Next, FIG. 5B will be described.

Figure 5B:
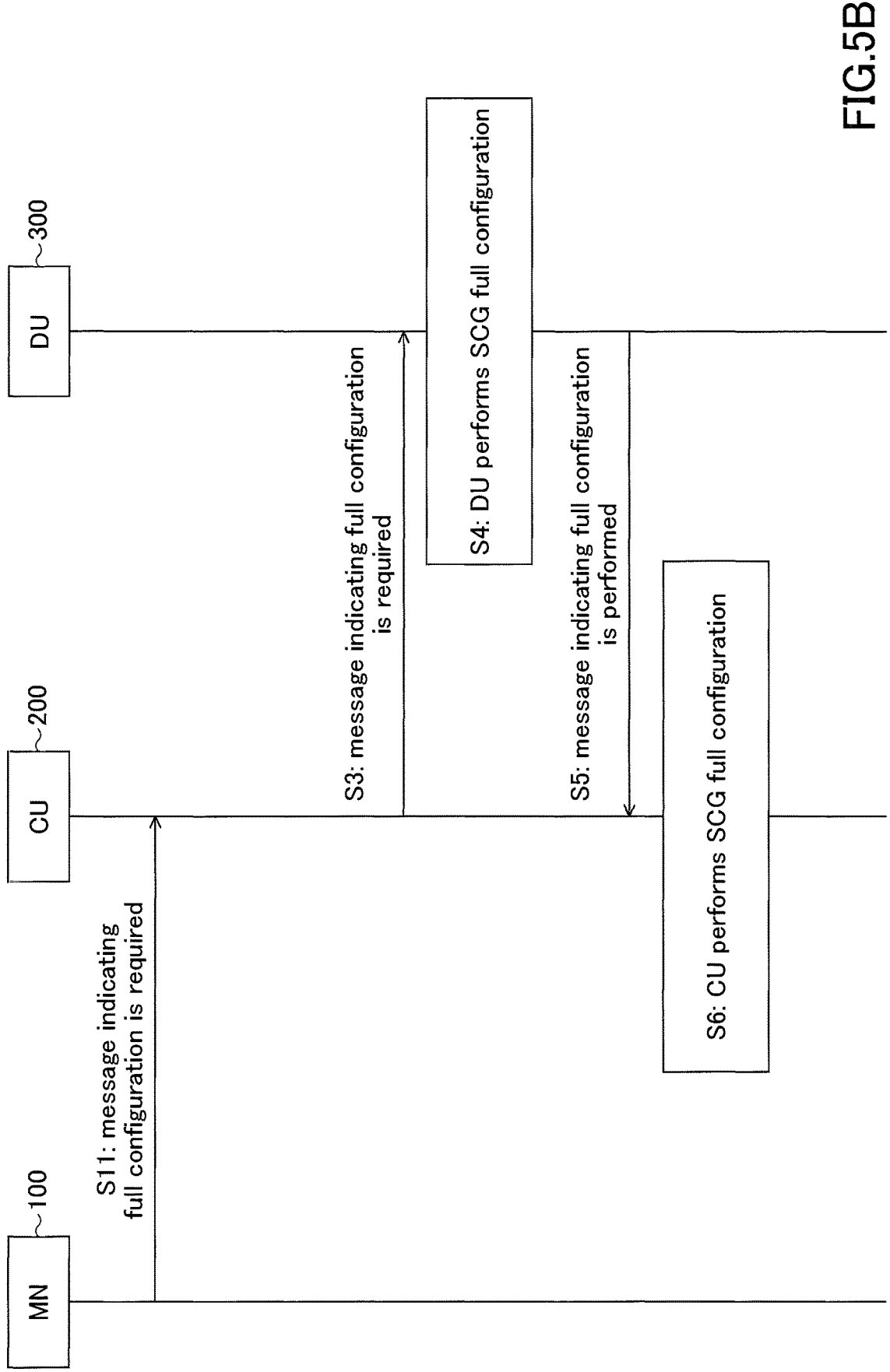
FIG. 5B is a diagram illustrating the first method for solving the problem.

In S11 of FIG. 5B, the CU 200 receives from the MN 100 a message requesting execution of full configuration. The CU 200 which received the message requesting execution of full configuration transmits to the DU 300 a message indicating that full configuration is required in S3. Since the operation of S3 to S6 of FIG. 5B is the same as that of S3 to S6 of FIG. 5A, the description is omitted.

(Second Method)

As a second method of solving the above-described problem, a method in which the CU removes the configured configuration and transfers it to the DU when the CU cannot understand the received configured configuration, or when the CU receives a message requesting execution of full configuration will be described with reference to FIGS. 6A and 6B.

Figure 6A:
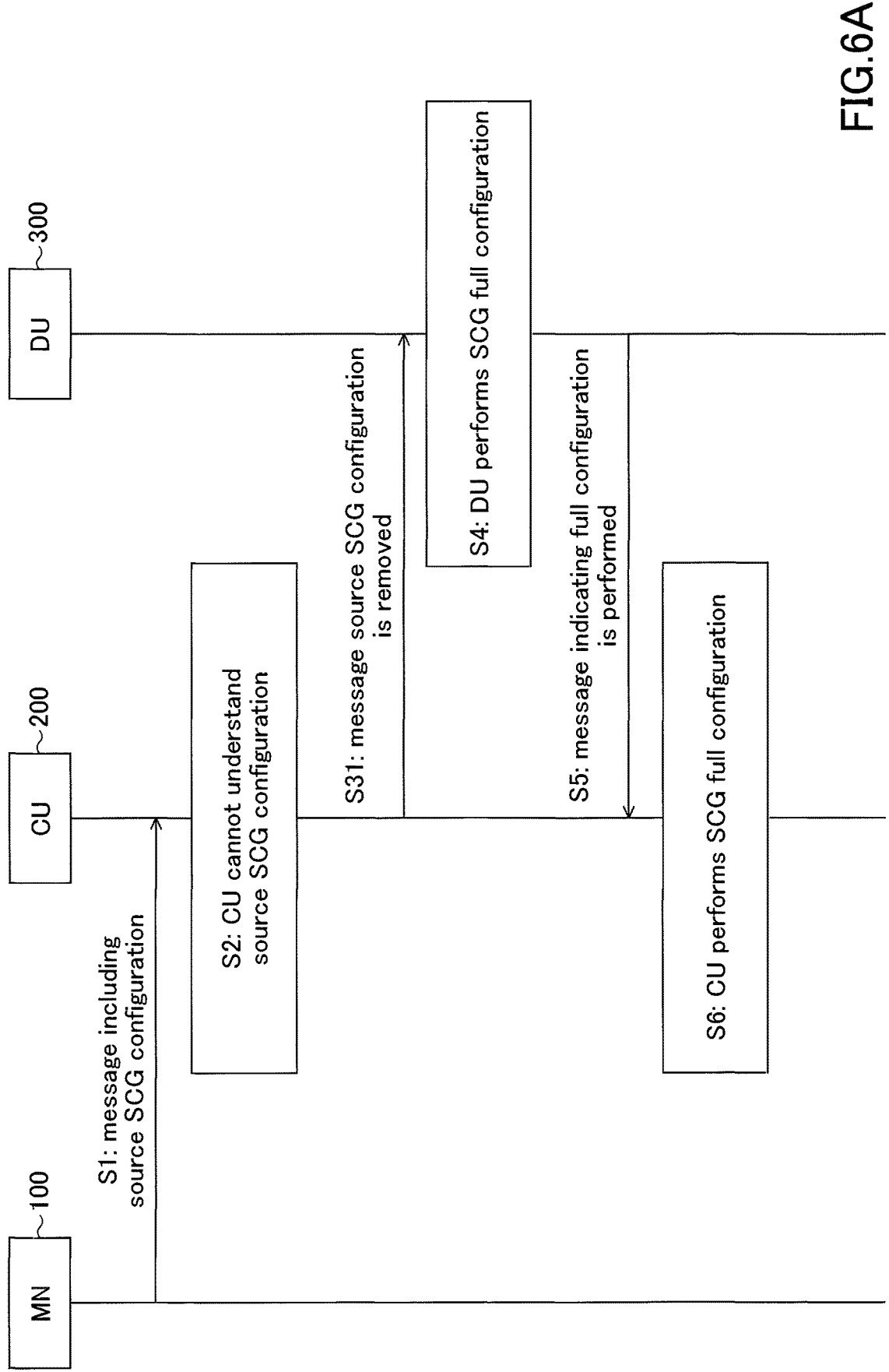
FIG. 6A is a diagram illustrating a second method for solving the problem.

Since S1 and S2 of FIG. 6A are similar to S1 and S2 of FIG. 5A, the description is omitted. Similar to the case of FIG. 5A, it is assumed that the CU 200 cannot understand the configured configuration, but the DU 300 can understand it.

First, FIG. 6A will be described.

The CU 200 which could not understand the configured configuration transmits to the DU 300 a message from which the configured configuration has been removed in S31. The message from which the configured configuration has been removed, for example, corresponds to "3. UE context setup Request" in the SN change procedure of FIG. 2 or "2. UE context setup Request" in the handover procedure of FIG. 4. By transmitting the message from which the configured configuration has been removed, the CU 200 can implicitly indicate to the DU 300 that full configuration is required. The DU 300 which received the message from which the configured configuration has been removed generates full configuration in S4. In S5, the DU 300 transmits to the CU 200 a message indicating that full configuration has been generated. The Message indicating that full configuration has been generated, for example, corresponds to "4. UE context setup Response" in the SN change procedure of FIG. 2 or "3. UE context setup Response" in the handover procedure of FIG. 4. The CU 200 which received from the DU 300 the message indicating that full configuration has been generated generates full configuration in S6. Thus, full configuration is generated in both of the CU 200 and the DU 300, and the understanding mismatch between the CU and the DU for the configured configuration is resolved.

Next, FIG. 6B will be described.

In S11 of FIG. 6B, the CU 200 receives a message from the MN 100 requesting execution of full configuration. The CU 200 which received the message requesting execution of full configuration, transmits to the DU 300 a message from which the configured configuration has been removed, in S31. The operation from S31 to S6 of FIG. 6B is the same as the operation from S31 to S6 of FIG. 6A, and thus, the description is omitted.

(Third Method)

A third method will be described with reference to FIG. 7.

In the first and second methods, the CU 200 explicitly or implicitly notifies the DU 300 that full configuration is required.

In the third method, the CU 200 which could not understand configured configuration notifies a source node of the configured configuration that it could not understand the configured configuration. The source node is, for example, the MN in the SN change procedure of FIG. 2, or the S-gNB-CU in the handover procedure of FIG. 4.

Figure 7:
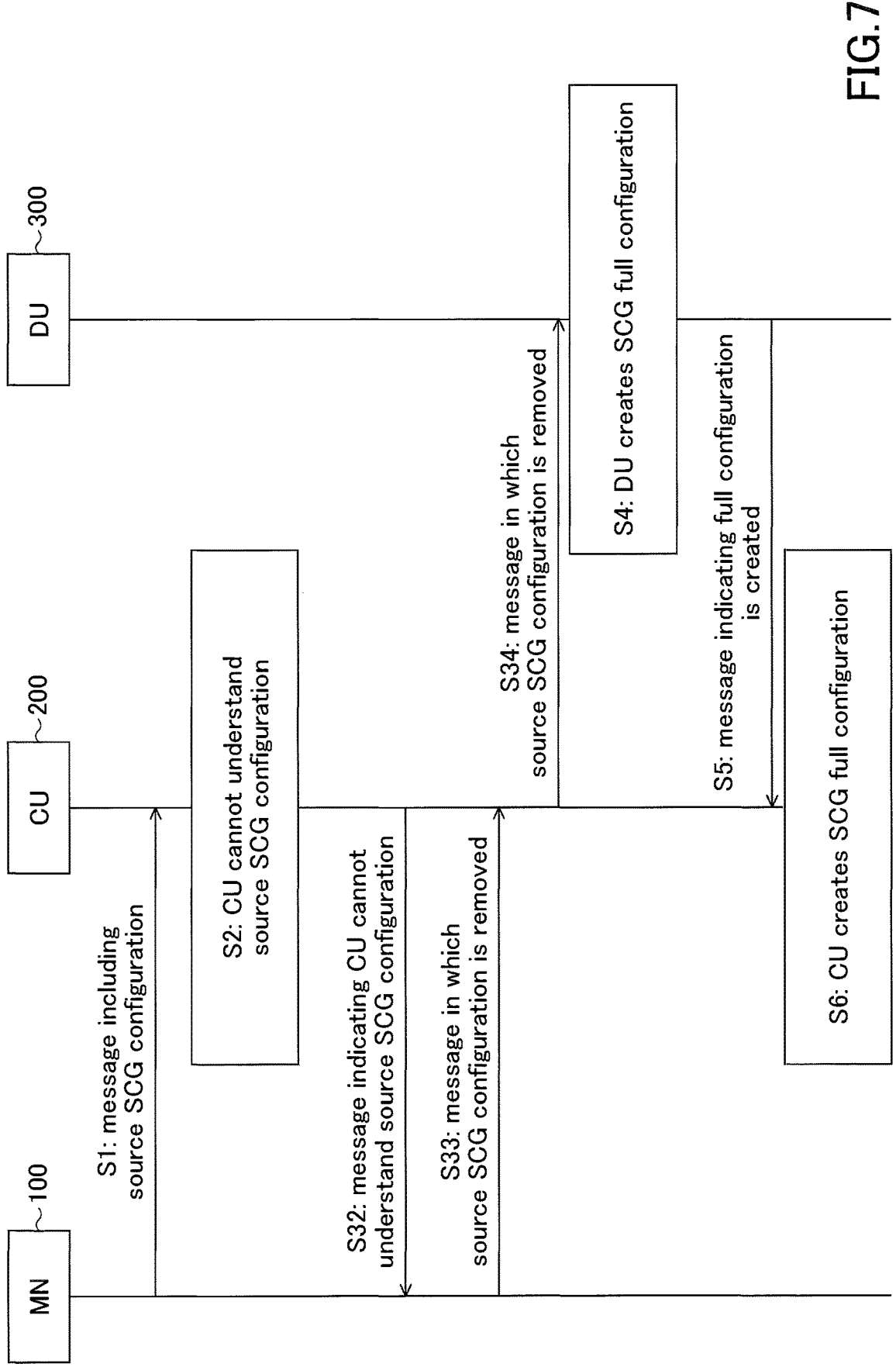
FIG. 7 is a diagram illustrating a third method for solving the problem.

Since S1 and S2 of FIG. 7 are similar to S1 and S2 of FIGS. 5A and 6A, the description is omitted. Similar to the cases of FIGS. 5A and 6A, it is assumed that the CU 200 cannot understand the configured configuration, but the DU 300 can understand it.

The CU 200 which could not understand the configured configuration, transmits to the source node of the configured configuration a message indicating that the CU 200 could not understand the configured configuration. The source node is the MN 100 in the example of FIG. 7. The MN 100, which received the message indicating that the CU 200 could not understand the configured configuration, transmits to the CU 200 a message from which configured configuration has been removed in S33. The message from which the configured configuration has been removed is, for example, an SgNB Addition Request from which the configured configuration has been removed. The CU 200 which received the message from which the configured configuration has been removed, transmits to the DU 300 the message from which the configured configuration has been removed in S34. The DU 300 which received the message from which the configured configuration has been removed, generates full configuration in S4. In S5, the DU 300 transmits to the CU 200 a message indicating that full configuration has been generated. The CU 200 which received from the DU 300 the message indicating that full configuration has been generated generates full configuration in S6. Thus, full configuration is generated in both of the CU 200 and the DU 300, and the understanding mismatch between the CU and the DU for the configured configuration is resolved.

(Other Methods)

In the third method described above, it may be considered that in S33, the MN 100 transmits directly to the DU 300 a message from which the configured configuration has been removed instead of transmitting to the CU 200 the message from which the configured configuration has been removed. In this case, an interface between the MN 100 and the DU 300 is required to be defined.

As another method, it may be considered to allow use of both of full configuration and delta configuration between the CU-DU. In this case, the understanding mismatch between the CU and the DU for the configured configuration itself is not a problem.

(Device Configuration)

<CU 200>

Figure 8:
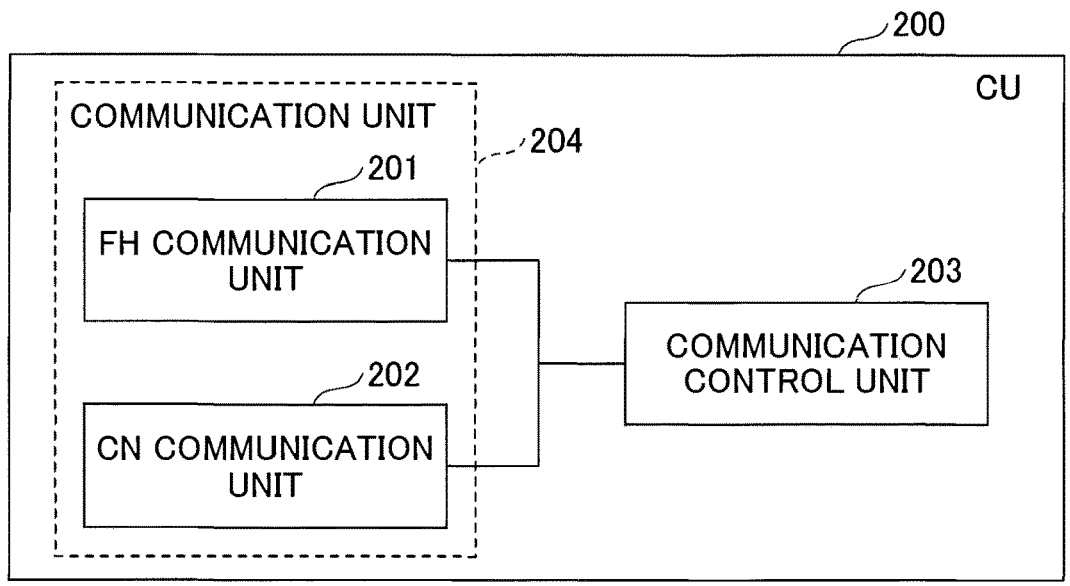
FIG. 8 is a diagram illustrating a configuration example of the CU.

FIG. 8 is a diagram showing a functional configuration example of the CU 200. As shown in FIG. 8, the CU 200 includes an FH communication unit 201, a CN communication unit 202, and a communication control unit 203. In addition, a component including the FH communication unit 201 and the CN communication unit 202 is referred to as a communication unit 204. The functional configuration shown in FIG. 8 is merely one example. As long as the operation according to the present embodiment can be executed, the function division and the name of the functional unit may be anything.

The FN communication unit 201 communicates with the DU. The CN communication unit 202 communicates with the core network. The communication control unit 203 executes control pertaining to the first method, the second method, and the third method described in the present embodiment. Functions of the communication control unit 203 may be included in the communication unit 204.

For example, in the radio communication system including a first communication device (e.g., CU) and a second communication device (e.g., DU), the CU is a communication device used as the second communication device. For example, when the communication control unit 203 could not understand received configured configuration, (1) the communication control unit 203 transmits to the DU 300 a message indicating that full configuration is required; (2) transmits to the DU 300 a UE context setup Request from which the configured configuration has been removed; or (3) transmits to a transmission source node of the configured configuration a message indicating that the configured configuration could not be understood.

In addition, when a message requesting execution of full configuration is received, the communication control unit 203 (1) transmits to the DU 300 a message indicating that full configuration is required; or (2) transmits to the DU 300 a UE context setup Request from which the configured configuration has been removed.

<DU 300>

Figure 9:
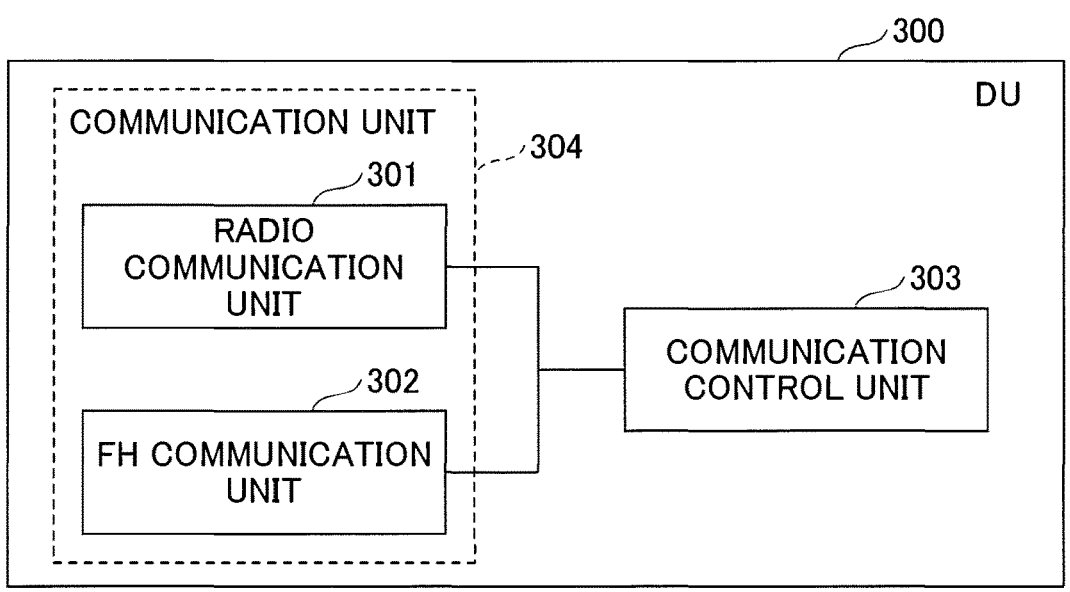
FIG. 9 is a diagram illustrating a configuration example of the DU.

FIG. 9 is a diagram illustrating a functional configuration example of a DU 300. As shown in FIG. 9, the DU 300 includes a radio communication unit 301, an FH (front haul) communication unit 302, and a communication control unit 303. A component including the radio communication unit 301 and the FH communication unit 302 is referred to as a communication unit 304. The functional configuration shown in FIG. 8 is merely one example. As long as the operation according to the present embodiment can be executed, the function division and the name of the functional unit may be anything.

The radio communication unit 301 wirelessly communicates with a user device. The FH communication unit 302 communicates with the CU 200. When the communication control unit 303 receives from the CU 200 a UE context setup Request explicitly indicating that full configuration is required, the communication control unit 303 executes full configuration and transmits to the CU 200 a message indicating that full configuration has been executed. When the communication control unit 303 receives from the CU 200 the UE context setup request from which the configured configuration has been removed, the communication control unit 303 executes full configuration and transmits to the CU 200 a message indicating that full configuration has been executed.

It is noted that functions of the communication control unit 303 may be included in the communication unit 304.

For example, a DU is a communication device. In this case, for example, when the communication unit 304 receives from another communication device a UE context setup Request indicating that full configuration is required, the communication unit 304 executes full configuration and transmits to said another communication device a message indicating that full configuration has been executed.

(Hardware Configuration)

The block diagrams used in the description of the above embodiments (FIGS. 8 and 9) illustrate blocks in the units of functions. These functional blocks (constituent units) are embodied in a combination of hardware and/or software. In addition, means for embodying the functional blocks is not particularly limited. That is, each functional block may be embodied by one unit in which a plurality of elements are physically and/or logically coupled, or may be embodied by two or more units which are physically and/or logically separated and which are connected directly and/or indirectly (for example, in a wired and/or wireless manner).

Figure 10:
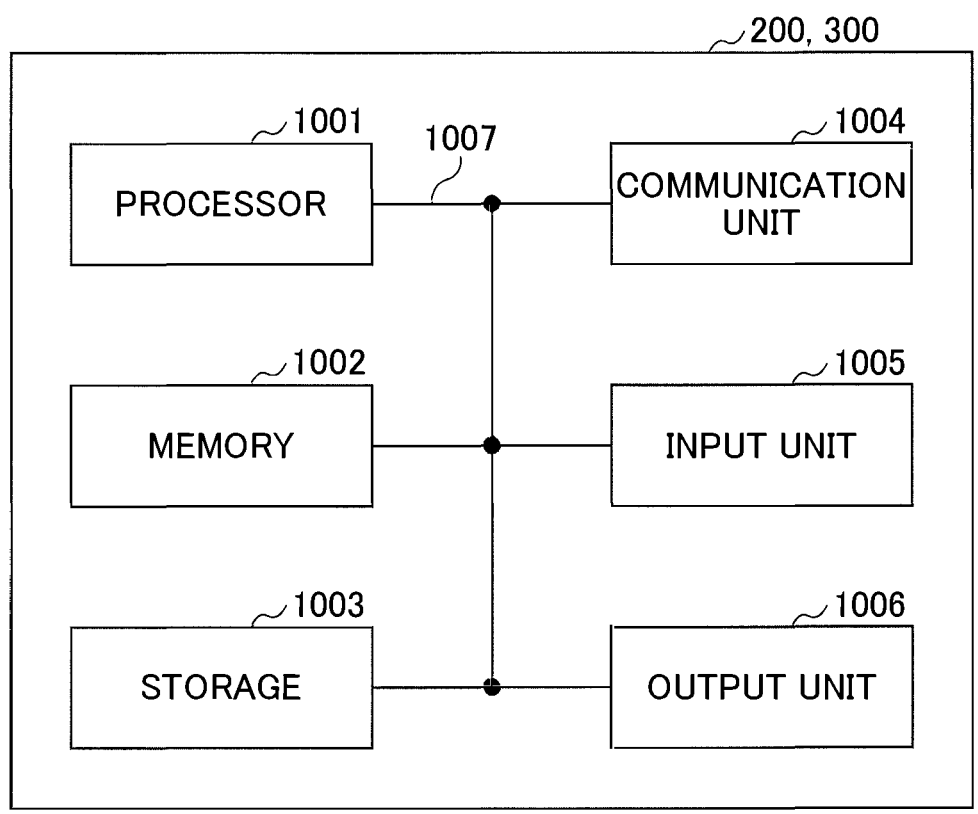
FIG. 10 is a diagram illustrating an example of a hardware configuration.

In addition, for example, both of the CU 200, the DU 300 in an embodiment of the present invention may function as computers that perform the processes according to the present embodiment. FIG. 10 is a diagram illustrating a hardware configuration example of the CU 200, the DU 300 according to the present embodiment. The CU 200, the DU 300 described above may be respectively physically constituted as a computer device including a processor 1001, a memory 1002, a storage 1003, a communication unit 1004, an input unit 1005, an output unit 1006, and a bus 1007, and the like.

It is noted that in the following description, a word "unit" may be referred to as a circuit, a device, a unit, or the like. The hardware configurations of the CU 200, the DU 300 may include one or more of units illustrated with 1001 to 1006 shown in the drawing or may not include some units.

Each function of the CU 200, the DU 300 are realized by causing hardware such as the processor 1001 and the memory 1002 to read predetermined software (a program) and causing the processor 1001 to perform computation and to control communication of the communication unit 1004 and reading and/or writing of data in the memory 1002 and the storage 1003.

The processor 1001 controls the computer as a whole, for example, by operating an operating system. The processor 1001 may be constituted by a central processing unit (CPU)

including an interface with peripherals, a control unit, a calculation unit, a register, and the like.

In addition, the processor 1001 reads a program (program codes), a software module, or data from the storage 1003 and/or the communication unit 1004 to the memory 1002 and performs various processes in accordance therewith. As the program, a program causing a computer to perform at least a part of the operations in the embodiment described above is used. For example, each function of the CU 200, DU 300 may be embodied by a control program which is stored in the memory 1002 and operated by the processor 1001. Various processes described above have been described to be performed by a single processor 1001, but may be simultaneously or sequentially performed by two or more processors 1001. The processor 1001 may be mounted as one or more chips. It is noted that the program may be transmitted from a network via an electric communication line.

The memory 1002 is a computer-readable recording medium and may be constituted, for example, by at least one of a read only memory (ROM), an erasable programmable ROM (EPROM), an electrically erasable programmable ROM (EEPROM), a random access memory (RAM), and the like. The memory 1002 may be referred to as a register, a cache, or a main memory (a main storage unit). The memory 1002 can store a program (program codes), a software module, or the like which can be used to perform the processes according to an embodiment of the present invention.

The storage 1003 is a computer-readable recording medium and may be constituted, for example, by at least one of an optical disc such as a compact disc ROM (CD-ROM), a hard disk drive, a flexible disk, a magneto-optical disk (such as a compact disk, a digital versatile disk, or a Blu-ray (registered trademark) disk), a smart card, a flash memory (such as a card, a stick, or a key drive), a floppy (registered trademark) disk, a magnetic strip, and the like. The storage 1003 may be referred to as an auxiliary storage unit. The recording medium described above may be for example a database including the memory 1002 and/or the storage 1003, a server, and another appropriate medium.

The communication unit 1004 is hardware (a transceiver device) that allows communication between computers via a wired and/or wireless network and is referred to as, for example, a network device, a network controller, a network card, a communication module, or the like. For example, the communication unit of each device may be embodied by the communication unit 1004.

The input unit 1005 is an input device (such as a keyboard, a mouse, a microphone, a switch, a button, or a sensor) that receives an input from the outside. The output unit 1006 is an output device (such as a display, a speaker, or an LED lamp) that performs outputting to the outside. It is noted that the input unit 1005 and the output unit 1006 may be constituted as a unified body (such as a touch panel).

In addition, the units such as the processor 1001 and the memory 1002 are connected to each other via the bus 1007 for communicating information. The bus 1007 may be constituted by a single bus or may be constituted by different buses between the units.

In addition, the CU 200, the DU 300 may be respectively constituted to include hardware such as a microprocessor, a digital signal processor (DSP), an application specific integrated circuit (ASIC), a programmable logic device (PLD), or a field programmable gate array (FPGA) or a part or all of the functional blocks may be embodied by the hardware. For example, the processor 1001 may be mounted as at least one such hardware module.

Summary of Embodiments

As described above, with the present embodiment, there is provision of a communication device (CU) that notifies another communication device (DU) that full configuration is required to be executed when the CU cannot understand a configured configuration or when the CU receives a message requesting execution of full configuration.

With the above configuration, there is provision of a technology in a radio communication system which resolves the understanding mismatch between the CU and the DU when the CU cannot understand the received configured configuration but the DU can understand it, and clarifies the operation of the CU when the CU receives a message requesting execution of full configuration.

Supplement to Embodiments

While the embodiment of the present invention has been described above, the disclosed inventions are not limited to the embodiment, and it could be understood by those skilled in the art that various modifications, corrections, alternatives, replacements, and the like can be made thereto. While specific numerical examples have been used to facilitate understanding of the invention, the numerical values are just an example and appropriate values may be used, unless otherwise specified. Divisions of the described items in the above description are not essential to the present invention, and details described in two or more articles may be combined for use if necessary, or details of a certain article may be applied to details described in another article (unless incompatible). The boundaries of the functional units or the processing units in the functional block diagrams do not necessarily correspond to boundaries of physical components. The operations of two or more functional units may be performed by a single physical component or the operation of a single functional unit may be performed by two or more physical components. Regarding the processing procedure described in the embodiment, the order of processing may be changed as long as there is no contradiction. For convenience of processing explanation, the CU 200 and the DU 300 have been described using the functional block diagrams, but such devices may be embodied in hardware, software, or a combination thereof. Software operating by the processor included in each device according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

In addition, notification of information is not limited to the aspect/embodiment described in the specification, but may be performed using another manner. For example, the notification of information may be performed using physical layer signaling (for example, downlink control information (DCI) or uplink control information (UCI)), upper layer signaling (for example, radio resource control (RRC) signaling, medium access control (MAC) signaling, or broadcast information (master information block (MIB) and system information block (SIB))), other signals, or combinations thereof. In addition, the RRC signaling may be referred to as an RRC message and may be, for example, an RRC connection setup message or an RRC connection reconfiguration message.

The aspect/embodiment described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which these systems are extended.

The processing procedures, the sequences, the flowcharts, and the like of the aspects/embodiments described in the specification may be changed in the order as long as they are not incompatible with each other. For example, in the method described in the specification, various steps are described in an exemplary order and the method is not limited to the described specific order.

Specific operations which are performed by the base station eNB in the specification may be performed by an upper node thereof in some cases. In addition, the specific operations performed by the base station eNB may be performed by the base station gNB. In a network including one or more network nodes including the base station eNB, various operations which are performed to communicate with the user device UE can clearly be performed by the base station eNB and/or other network nodes (for example, an MME or an S-GW can be considered but the network nodes are not limited thereto) other than the base station eNB. A case in which the number of other network nodes, other than the base station eNB, is one has been described above; however, a combination of other network nodes (for example, an MME and an S-GW) may be used.

The respective aspects/embodiments described in the specification may be used alone, may be used in combination, or may be switched with implementation thereof.

The user equipment UE may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms by those skilled in the art.

The base station eNB may be referred to as a NodeB (NB), a base station, or some other appropriate terms by those skilled in the art.

As used in the specification, the terms "determining" and "deciding" may include various types of operations. For example, "determining" and "deciding" may include deeming that to perform judging, calculating, computing, processing, deriving, investigating, looking up (for example, search in a table, a database, or another data structure), or ascertaining is to perform "determining" or "deciding". In addition, "determining" and "deciding" may include deeming that to perform receiving (for example, reception of information), transmitting (for example, transmission of information), input, output, or accessing (for example, accessing data in memory) is to perform "determining" or "deciding". Further, "determining" and "deciding" may include deeming that to perform resolving, selecting, choosing, establishing, comparing, or the like is to perform "determining" or "deciding". Namely, "determining" and "deciding" may include deeming that some operation is to perform "determining" or "deciding".

As used in the specification, an expression "on the basis of" does not refer to "on the basis of only," unless otherwise specified. In other words, the expression "on the basis of" refers to both "on the basis of only" and "on the basis of at least."

So long as terms "include" and "including" and modifications thereof are used in the specification or the appended claims, these terms are intended to have a comprehensive meaning similar to a term "comprising." A term "or" which is used in the specification or the claims is intended not to mean an exclusive or.

In the entire disclosure, for example, when an article such as a, an, or the is added in translation into English, such an article may refer to including the plural unless otherwise recognized from the context.

Although the present invention is described above in detail, it is obvious to those skilled in the art that the present invention is not limited to the embodiment described in the specification. The present invention can be implemented as modifications and alterations without departing from the gist and scope of the present invention defined in claims set forth below. Accordingly, the description of the specification is intended to be exemplary and does not have any restrictive meaning to the present invention.

EXPLANATIONS OF LETTERS OR NUMERALS

100 MN
200 CU
300 DU
201 FH communication unit
202 CN communication unit
203 communication control unit
204 communication unit
301 radio communication unit
302 FH communication unit
303 communication control unit
304 communication unit
1001 processor
1002 memory
1003 storage
1004 communication unit
1005 input unit
1006 output unit

The invention claimed is:
1. A first communication device comprising:
a processor configured to receive a Secondary gNodeB (SgNB) Addition Request including a configuration of a source cell group during a Secondary Node change procedure,
wherein the processor transmits a user equipment (UE) context setup Request, the UE context setup Request not including the configuration of the source cell group, to a second communication device and receives, from the second communication device, a UE context setup RESPONSE message indicating that full configuration has been applied.
2. A second communication device comprising:
a processor configured to receive a user equipment (UE) context setup Request that does not include a configuration of a source cell group during a Secondary Node change procedure from a first communication device,
wherein the processor applies full configuration upon receiving the UE context setup Request, the UE context setup Request not including the configuration of the source cell group, and transmits, to the first communi- cation device, a UE context setup RESPONSE message indicating that the full configuration has been applied.

3. A communication method comprising:

receiving a Secondary gNodeB (SgNB) Addition Request including a configuration of a source cell group during a Secondary Node change procedure at a first communication device; and transmitting a user equipment (UE) context setup Request, the UE context setup Request not including the configuration of the source cell group, to a second communication device; and receiving, from the second communication device, a UE context setup RESPONSE message indicating that full configuration has been applied.

\* \* \* \* \*